US010776253B2

(12) United States Patent
Earanti et al.

(10) Patent No.: US 10,776,253 B2
(45) Date of Patent: Sep. 15, 2020

(54) TEST MANAGER TO COORDINATE TESTING ACROSS MULTIPLE TEST TOOLS

(71) Applicant: Dell Products L. P., Round Rock, TX (US)

(72) Inventors: Venkatesa Babu Earanti, Georgetown, TX (US); William Cody Taylor, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 163 days.

(21) Appl. No.: 15/969,380

(22) Filed: May 2, 2018

(65) Prior Publication Data

US 2019/0340113 A1 Nov. 7, 2019

(51) Int. Cl.
*G06F 9/44* (2018.01)
*G06F 11/36* (2006.01)

(52) U.S. Cl.
CPC ...... *G06F 11/3688* (2013.01); *G06F 11/3664* (2013.01)

(58) Field of Classification Search
CPC .......................... G06F 11/3688; G06F 11/3664
USPC ......................................................... 717/131
See application file for complete search history.

(56) References Cited

U.S. PATENT DOCUMENTS

| | | | | |
|---|---|---|---|---|
| 6,249,882 B1 * | 6/2001 | Testardi | ............ | G06F 11/3672 714/38.14 |
| 7,039,912 B1 * | 5/2006 | Moulden, Jr. | ....... | G06F 11/3664 714/E11.207 |
| 7,343,587 B2 * | 3/2008 | Moulden, Jr. | ....... | G06F 11/3664 714/E11.207 |
| 7,526,681 B2 * | 4/2009 | Anafi | ................. | G06F 11/3664 714/38.14 |
| 7,895,565 B1 * | 2/2011 | Hudgons | ............. | G06F 11/3684 717/106 |
| 8,949,673 B2 * | 2/2015 | Rapp | ................... | G06F 11/3672 714/38.1 |
| 9,053,238 B2 * | 6/2015 | Krishnan | ............ | G06F 11/3664 |
| 9,092,578 B2 * | 7/2015 | Wefers | ................ | G06F 11/3688 |
| 9,317,411 B2 * | 4/2016 | Kalyanasundram | ......................... | G06F 11/3688 |
| 10,127,141 B2 * | 11/2018 | Kalyanasundram | ......................... | G06F 11/3672 |
| 10,162,740 B1 * | 12/2018 | Setty | ................... | G06F 11/3672 |
| 10,169,206 B2 * | 1/2019 | Magre | ................ | G06F 11/3664 |
| 10,289,535 B2 * | 5/2019 | Yadav | ................ | G06F 11/3688 |
| 10,628,276 B2 * | 4/2020 | Shinge | ............... | H04L 41/5038 |

(Continued)

*Primary Examiner* — Hiren P Patel
(74) *Attorney, Agent, or Firm* — Campbell Stephenson LLP; Shiv S. Naimpally

(57) ABSTRACT

In some examples, a server may perform various operations, including receiving a set of tests to be performed across multiple software components, receiving one or more inputs, selecting a first test of the set of tests, instructing a first test tool to perform the first test on a first software component using the one or more inputs, and receiving first results from the first test tool performing the first test to the first software component using the one or more inputs. The multiple software components may include at least the first software component written in a first language and tested with the first test tool and a second software component written in a second language and tested with a second test tool. The operations may include selecting a second test, instructing a second test tool to perform the second test to a second software component, and receiving second results.

16 Claims, 4 Drawing Sheets

(56) References Cited

U.S. PATENT DOCUMENTS

| | | | | |
|---|---|---|---|---|
| 2001/0052089 A1* | 12/2001 | Gustavsson | .......... | G06F 11/3692 |
| | | | | 714/38.1 |
| 2008/0244524 A1* | 10/2008 | Kelso | .................. | G06F 11/3688 |
| | | | | 717/124 |
| 2011/0301928 A1* | 12/2011 | Ifflander | ................. | G05B 17/02 |
| | | | | 703/6 |
| 2013/0042222 A1* | 2/2013 | Maddela | ............. | G06F 11/3684 |
| | | | | 717/124 |
| 2014/0123114 A1* | 5/2014 | Navalur | .............. | G06F 11/3688 |
| | | | | 717/127 |
| 2015/0109461 A1* | 4/2015 | Ahuja | .................. | H04N 17/002 |
| | | | | 348/187 |
| 2018/0089066 A1* | 3/2018 | Barnett | ............... | G06F 11/3684 |
| 2018/0239802 A1* | 8/2018 | Fabijancic | .......... | G06F 11/3664 |

\* cited by examiner

200 ⬐

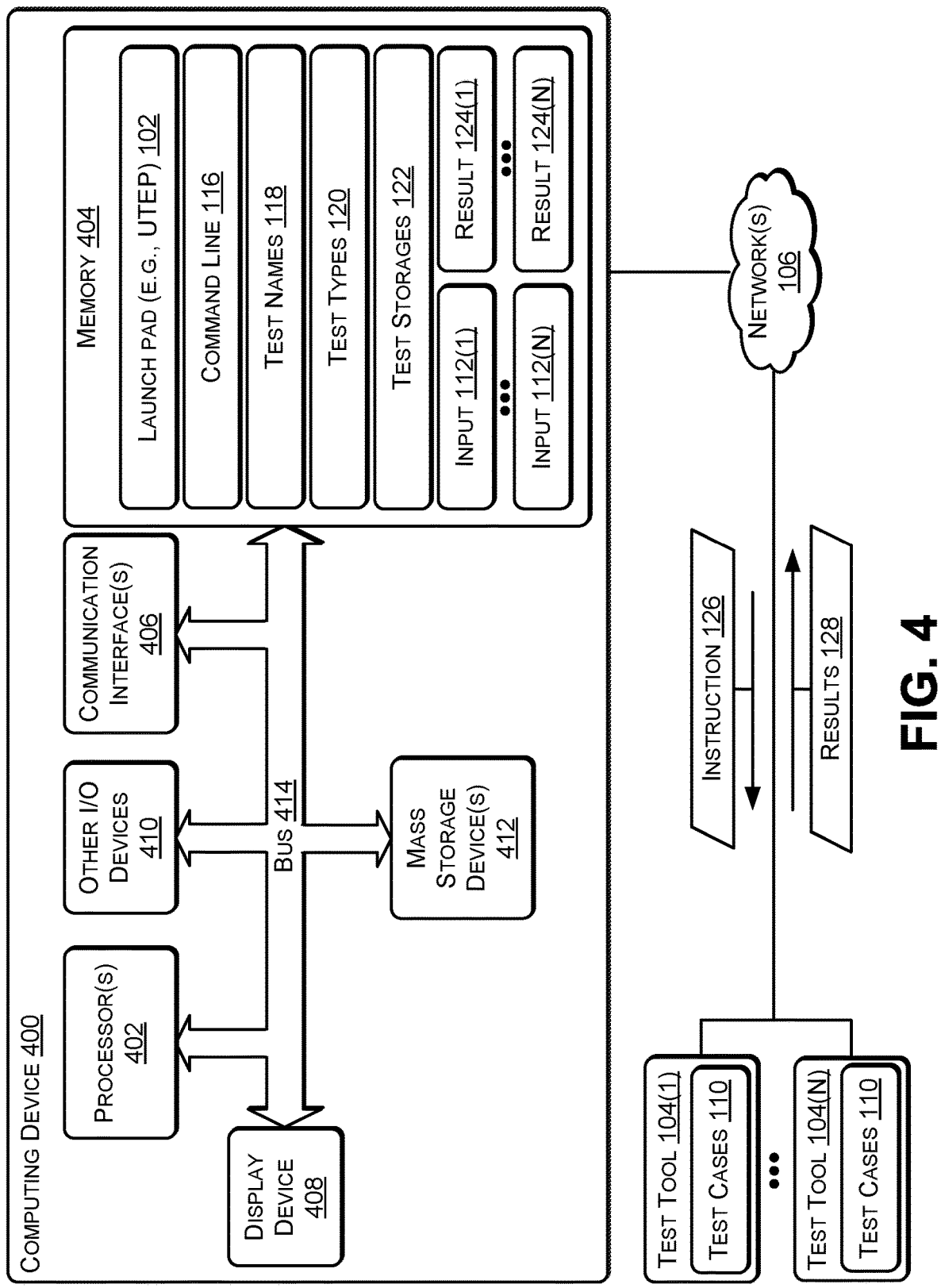

TEST MANAGER TO COORDINATE TESTING ACROSS MULTIPLE TEST TOOLS

BACKGROUND OF THE INVENTION

Field of the Invention

This invention relates generally to computing devices and, more particularly to managing end-to-end testing of a system in which the system includes multiple components with individual components that use a particular test platform that is different from at least one other components of the system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a corporation, multiple departments may be responsible for different aspects of a customer's experience. For example, something as seemingly simple as a user browsing products and services on a site, adding at least one product or service to a cart, and checking out (e.g., including paying for the product or service), may involve software created and maintained by multiple departments or business units. To illustrate, a first department may display products and services on a site according to an inventory and based on the user's geographic location. A second department may manage items that are automatically (e.g., without human interaction) added to a cart when a particular product or service is added. To illustrate, when a user adds a product, such as a computing device, to a cart, a corresponding warranty and specific promotional items (e.g., mouse, keyboard, anti-virus software, or the like) may be automatically added to the cart. A third department may be responsible for the payment aspects of the checkout, e.g., receiving, verifying, and processing payment information. A fourth department may be responsible for updating inventory. A fifth department may be responsible for notifying the appropriate warehouse(s) to ship the ordered products.

Each department may use a particular software development language (e.g., C, C++, C #, Java, JavaScript, and the like) to develop software applications that implement the functionality for which their respective department is responsible and may use a particular testing platform (e.g., Jira, Selenium, Test Complete, Quick Test Professional, Appium, and the like) to develop and execute test cases to test the software applications. Often, at least one department may use a particular testing platform that is different from another department's testing platform. In some cases, each department may use their own particular testing platform that may be different from the testing platforms used by the other departments. Such a system, in which different aspects of user's journey from browsing to checkout is handled by different departments with different testing platforms, may be difficult to manage from a testing perspective. For example, testing a case from end-to-end, in which a user browses products and services on a site, adds at least one product or service to a cart, and checks out (e.g., pays for the product or service), may be difficult to test because two or more components may involve two or more testing platforms.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may perform various operations, including receiving a set of tests to be performed across multiple software components. receiving one or more inputs, selecting a first test of the set of tests, instructing a first test tool to perform the first test on a first software component using the one or more inputs, and receiving first results from the first test tool performing the first test to the first software component using the one or more inputs. The multiple software components may include at least the first software component written in a first language and for testing with the first test tool and a second software component written in a second language for testing with a second test tool. The operations may include selecting a second test, instructing a second test tool to perform the second test to a second software component using the one or more inputs and the first results, and receiving second results from the second test tool.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 4 illustrates an example configuration of a computing device that can be used to implement the systems and techniques described herein.

DETAILED DESCRIPTION

Figure 1:
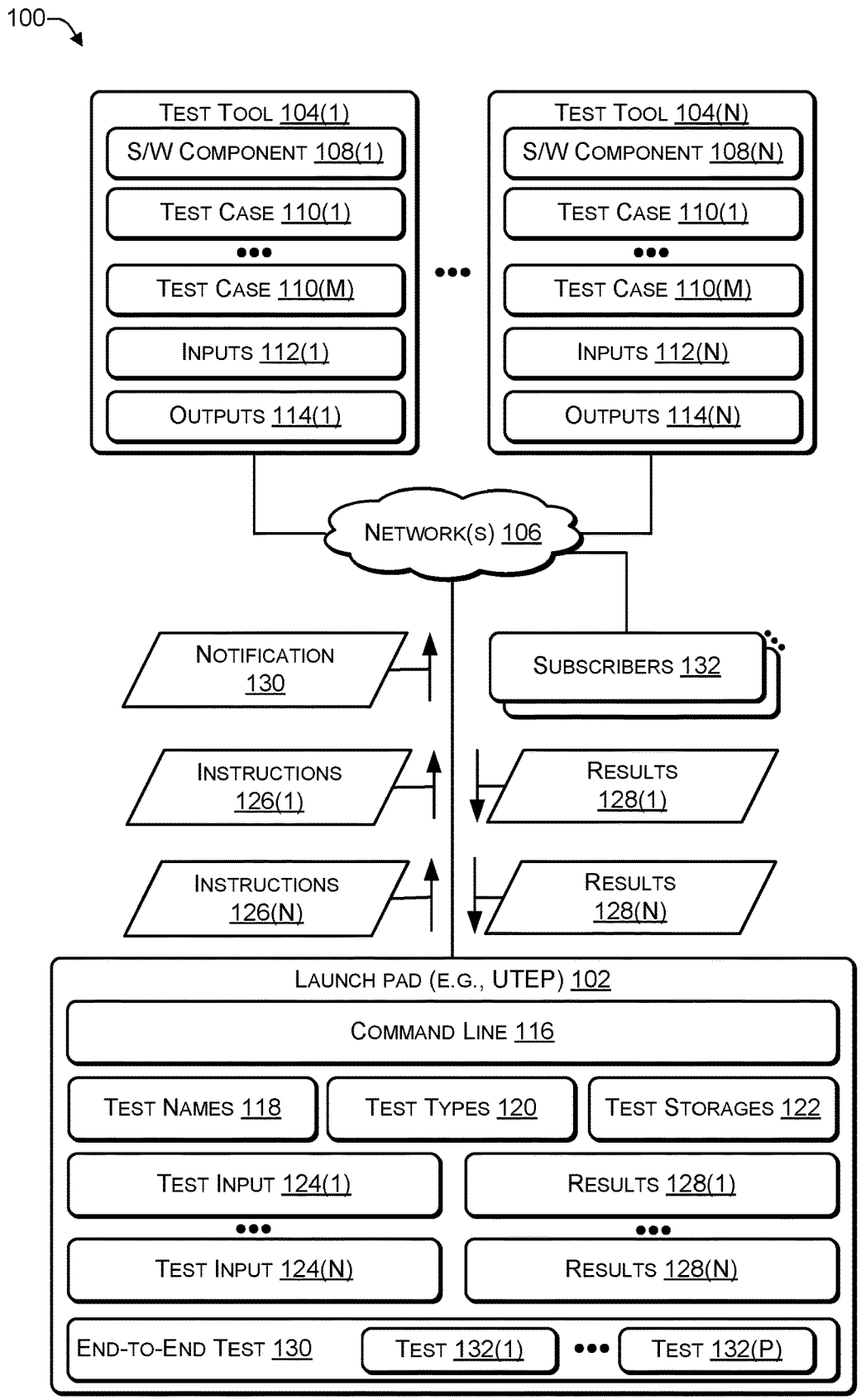
FIG. 1 is a block diagram of a system that includes a launch pad and multiple test tools according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein provide a unified test execution platform (UTEP). The UTEP described herein may enable users to remotely organize different automated lifecycle management (ALM), build and test automation tools to form a single coordinated set across platforms without requiring changes to existing tests and without having to migrate tests to different tools. ALM is the product lifecycle management (e.g., governance, development, and maintenance) of software applications and may include one or more of requirements management, software architecture, computer programming, software testing, software maintenance, change management, continuous integration, project management, and release management.

The system and techniques described herein enable cross-platform automation execution by enabling automated execution of manual test cases developed using various test tools. For example, each manual test case may be executed automatically by referencing each test case using a test name, a test type, and test storage. The system and techniques described herein enable users to automate and execute tests sequentially, in parallel, or any combination of sequential and parallel execution. For example, the test cases may be converted into command line execution statements to enable sequential and parallel execution.

The UTEP may enable each test case to save and share data with others test cases, including test cases written using other testing tools. For example, assume there are four software components: create an order, process an order, receive payment for an order, and ship an order. Assume each software component is written in a software language that is different from a software language used to implement each of the other software components. Assume each software component uses its own particular test tool suite. An end-to-end set of test cases can be created to create an order, process an order, receive payment for an order, and ship an order. An order may be created by instructing a first test tool to execute a create-order test case using a particular input, creating a first particular result. The order may be processed by instructing a second test tool to execute a process-order test case using the particular input and the first particular result to create a second particular result. Payment for the order may be received by instructing a third test tool to execute a receive-payment test case using the particular input and the second particular result to create a third particular result. The order may be shipped by instructing a fourth test tool to execute a ship-order test case using the particular input and the third particular result to create a fourth particular result. Thus, the results of performing each test case may be saved and used as input (along with the original input) for the next test case.

Automated execution of manual tests may be performed by referencing each manual test using a test name, a test type, and a test storage. The UTEP may enable a user to create and execute a test plan with multiple test cases being executed across multiple test suites, in which test cases may be executed in parallel, sequentially, or both. Each execution of a test plan may be associated with a test run identifier (ID). The UTEP may assign an available agent to a test case for execution. The UTEP may generate command line test case execution statements by using a test name, a test type, a test storage, along with a repository path to reference each test case. In some cases, the command line execution statement may be sent to the agent for test execution. The UTEP may save runtime data resulting from one test case and share the runtime data with others tests, thereby enabling users to build complex end-to-end automated test scenarios. The UTEP may receive execution status updates (e.g., first test case was successfully executed, second test case encountered a problem, etc.), reports (e.g., an order with a desktop computer, a 27" display device, a keyboard, and a mouse was created, processed, paid for, and shipped), and the like. In some cases, such as when an error is encountered when executing a test case, the UTEP may automatically send a notification (e.g., an email, a text, an instant message, or the like) with an execution status to subscribers. For example, each department associated with a software component may subscribe to the results of executing test cases associated with the software component. An error executing one or more test cases may cause subscribers to receive a message indicating that executing the test case(s) caused an error. Table 1 illustrates how a test suite of 6 test cases may be created and executed to simulate how a user might place an order, how the ordered product is built, how payment is provided, how the order is shipped, and how the order is tracked. Table 2 illustrates results from performing the test suite illustrated in Table 1. For example, as illustrated in Table 2, two of the test cases (e.g., process order and ship order) might fail while the remaining test cases might pass.

TABLE 1

Test Suite

| Test Case ID | Execution Order | Automated Test Storage | Automated Test Type | Automated text Name |
|---|---|---|---|---|
| 658745 | 1 | OrderCreate.dll | Unit Test | Order_Laptop |
| 123451 | 2 | OrderProcess.jar | TestNG | Process_Order |
| 354215 | 3 | TC\Build_Fulfill | OpenScript | Build_Laptop |
| 897456 | 4 | FinServices.jar | jUnit | Issue_Credit |
| 254698 | 5 | Shipment.jar | TestNG | Ship_Package |
| 587426 | 6 | TrackOrder.dll | nUnit | Track_Package |

TABLE 2

Results

| TestRunID | TestCaseID | Status | TestData | Result |
|---|---|---|---|---|
| 36 | 658745 | Pass | Input 1 | Created Order |
| 36 | 123451 | Fail | Input 1 | Order not processed |

TABLE 2-continued

Results

| TestRunID | TestCaseID | Status | TestData | Result |
|---|---|---|---|---|
| 36 | 354215 | Pass | Input 1 | Laptop built |
| 36 | 897456 | Pass | Input 1 | Credit issued |
| 36 | 254698 | Fail | Input 1 | Shipping error |
| 36 | 587426 | Pass | Input 1 | Tracking available |

FIG. 1 is a block diagram of a system 100 that includes a launch pad and multiple test tools according to some embodiments. For example, a launch pad 102 may be connected to multiple test tools 104(1) to 104(N) via a network 106, where N>1 and typically, 3<N<9. The launch pad 102 may, for example, be a unified test execution platform (UTEP). Each of the test tools 104 may be associated with a particular software component 108 and may include multiple test cases 110 to test a particular software (abbreviated "S/W" in FIG. 1) component 108. For example, a test tool 104(1) may be used to test a software component 108(1) using one or more of test cases 110(1) to 110(M). When the test tool 104(1) is used to test the software component 108(1), one or more inputs such as, for example, inputs 112(1) may be used. Outputs 114(1) may be a result of performing one or more of the test cases 110 (e.g., using the input 112(1)) on the software component 108(1). Test tool 104(N) may be used to test a software component 108(N) using one or more of the test cases 110(1) to 110(M). The software component 108(N) may be tested using one or more inputs such as, for example, inputs 112(N). Testing the software component 108(N) using one or more of the test cases 110 may result in outputs 114(N). In some cases, at least two of the software components 108 may be written using different computer languages. For example, the software components 108 may, include two or more of Java, Python, JavaScript, C, C++, C #, PHP, Perl, or the like. Similarly, the test tools 104 may include two or more different types of test tools, (e.g., test environments), such as, for example, Selenium, Ranorex, Katalon, Appium, Test Studio, Cucumber, JIRA, Rational Functional Test, Silk, Eggplant, FitNesse, Unified Functional Testing, water, TestComplete, and the like.

The launch pad 102 may be used to instruct each of the test tools 104 to execute one or more of the test cases 110 to test a particular one of the software components 108. It should be noted that the test cases 110 for use with test tool 104(1) may be written in a particular testing language while the test cases 110 for use with test tool 104(N) may be written in a different testing language. Thus, each of the test cases 110 may be written in a particular language corresponding to the particular test tool 104.

In some cases, the launch pad 102 may use a command line interface 116 to instruct the test tools 104 to execute one or more of the test cases 110 to test the software components 108. For example, the command line 116 may be used by specifying one or more test names 118, one or more test types 120, and one or more test storages 122. These are three different types of frameworks that may be used to create the test cases 110. jUnit may be used to create test cases for Java-based software applications (e.g., software components). nUnit may be used to create test cases for .NET applications, such as, for example, C #-based software components. TestNG (NG=NextGeneration) is an option that is similar to both jUnit and nUnit, but provides certain functionality that the other two do not. Automation test developers may use jUnit, nUnit, and TestNG to develop automation test cases. The launchpad 102 may store a framework/tool name as one of the test names 118 and generate a command line statement based on automation test types 120 to execute the automated test.

The launch pad 102 may send instructions 126(1) to the test tool 104(1) to perform, in a particular order, one or more of the test cases 110 to the software component 108(1). The launch pad 102 may specify a particular test input 124(1) to use with the software component 108(1). After the test tool 104(1) has tested the software component 108(1), the launch pad 102 may receive a corresponding result 128(1). The launch pad 102 may combine the result 128(1) with the particular test input 124(1) to create test input 124(2) and send instructions 126(2) (e.g., N=2) to the test tool 104(2) to test the software component 108(2) using one of the test cases 110. In response, the launch pad 102 may receive results 128(2). The launch pad 102 may combine the results 128(2) with the particular test input 124(2) to create test input 124(3) and send instructions 126(3) to the test tool 104(3) to test the software component 108(3) using one of the test cases 110 and so on. The results 128 may indicate a result of performing one or more of the test cases 110, in a particular order, on a particular software component 108.

In some cases, the results 128 may indicate whether individual ones of the test cases 110 passed or failed. In some cases, a notification 130 may be sent to one or more subscribers 132 when a software component passes an individual one of the test cases 110, fails an individual one of the test cases 110, or in either case. For example, the launch pad 102 may instruct the test tool 104(N) perform test case 110(M) to test the software component 108(N). If the test case 110(M) does not pass, the result 128(N) may indicate that the test case 110(M) failed. In response, the launch pad 102 may send the notification 130 to one or more subscribers 132 indicating that the test case 110(M) failed when testing the software component 108(N).

Thus, a launch pad may be used to initiate tests of multiple software components that are implemented using different software languages and that are tested using test cases developed using different testing tools. In this way, for example, a large corporation with between about 4 to 8 departments maintaining about 4 to 8 software components and testing the software components using about 4 to 8 test tools (e.g., test environments) using test cases developed for each test tool may maintain and test their software components without having to migrate each of the software components to a common software language and without having to migrate the test cases to a common test tool (e.g., testing environment). The launch pad may enable end-to end testing. For example, a first test tool may perform a first test case using a first set of inputs to create an order (e.g., a desktop computer, a display device, a keyboard, and a mouse). The results of the first test case, e.g., an order, may be used to instruct a second test tool to perform a second test case using a second set of inputs (e.g., a combination of the first set of inputs and the results of the first test case) to process the order (e.g., determine if the items are in stock for delivery within a predetermined time frame). The results of the second test case, e.g., the processed order, may be used to instruct a third test tool to perform a third test case using a third set of inputs (e.g., a combination of the first set of inputs and the results of the second test case) to process payment for the order (e.g., receive credit card information, process coupon(s), process reward points, and the like). The results of the third test case, e.g., processing payment for the order, may be used to instruct a fourth test tool to perform a fourth test case using a fourth set of inputs (e.g., a combination of the first set of inputs and the results of the third test case) to ship the order (e.g., send orders to the nearest delivery warehouses).

Figure 2:
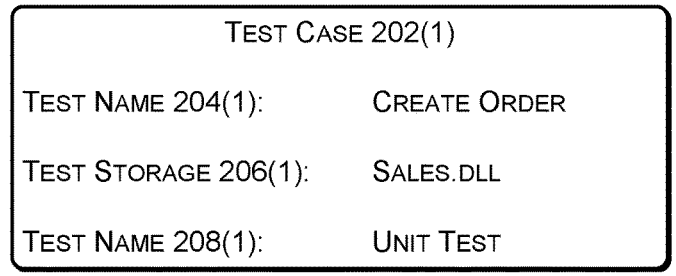
FIG. 2 is a block diagram illustrating multiple test cases according to some embodiments.
Figure 2:
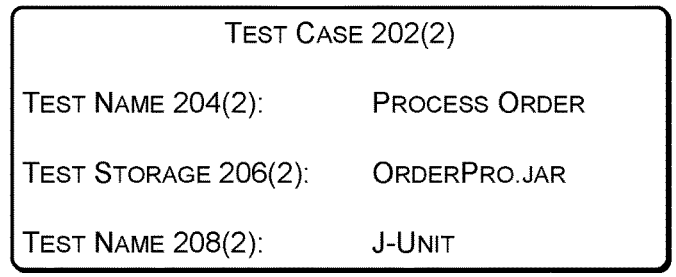
Figure 2:
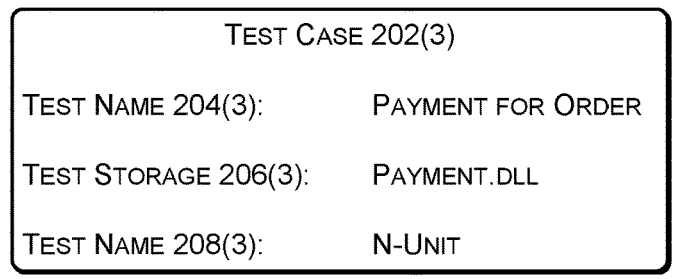
Figure 2:
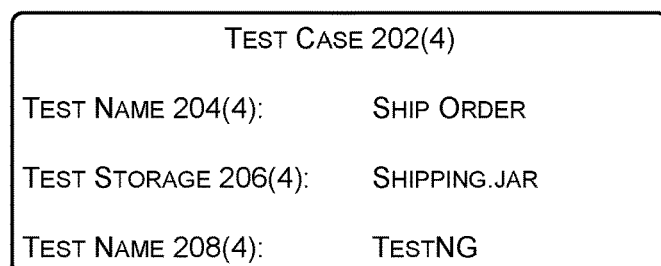

FIG. 2 is a block diagram 200 illustrating multiple test cases according to some embodiments. In FIG. 2, a test case 202(1) may be used to create a particular order, a test case 202(2) may be used to process an order, a test case 202(3) may be used to receive payment for an order, and test case 202(4) may be used to ship an order.

The test case 202(1) may be expressed on a command line as follows:
Vstest.console.exe"\\LpadTC10A021\DropFolder\ Regression_Automation_20180316.2\e2e.stp.tests\e 2e.stp.tests.dll"/Tests:
"E2E.STP.Tests.StpDesktopVersiontests.Desktop_ 4227413_UK_AddMultipleItems_CheckEmailCart"/Logger:trx The test case 202(2) may be expressed on a command line as follows:
cmd/c ant -buildfile "\\LpadTC10A020\DropFolder\20180320.1\ AutomationSynchro\build.xml" test -Djunit.output.dir="C: \Junit\JunitReports\167556"- DtestClassName=emif.EmifDof -DtestMethodName=test The test case 202(3) may be expressed on a command line as follows:
cmd/c nunit3-console "\\LPADA10ARIF1\DropFolder\NUnit_Build_ 20180409.1"\NUnitProject\NUnitProject.dll-- test="NUnitProject.MyTests.Test2"--result="C:\ NunitReports\118270\TestResults.xml"--params: browser=InternetExplorer;resultspath="C:\Program Files (x86)\Dell Technologies\LaunchpadRAC\Nunit\NunitReports\118270"

Figure 3:
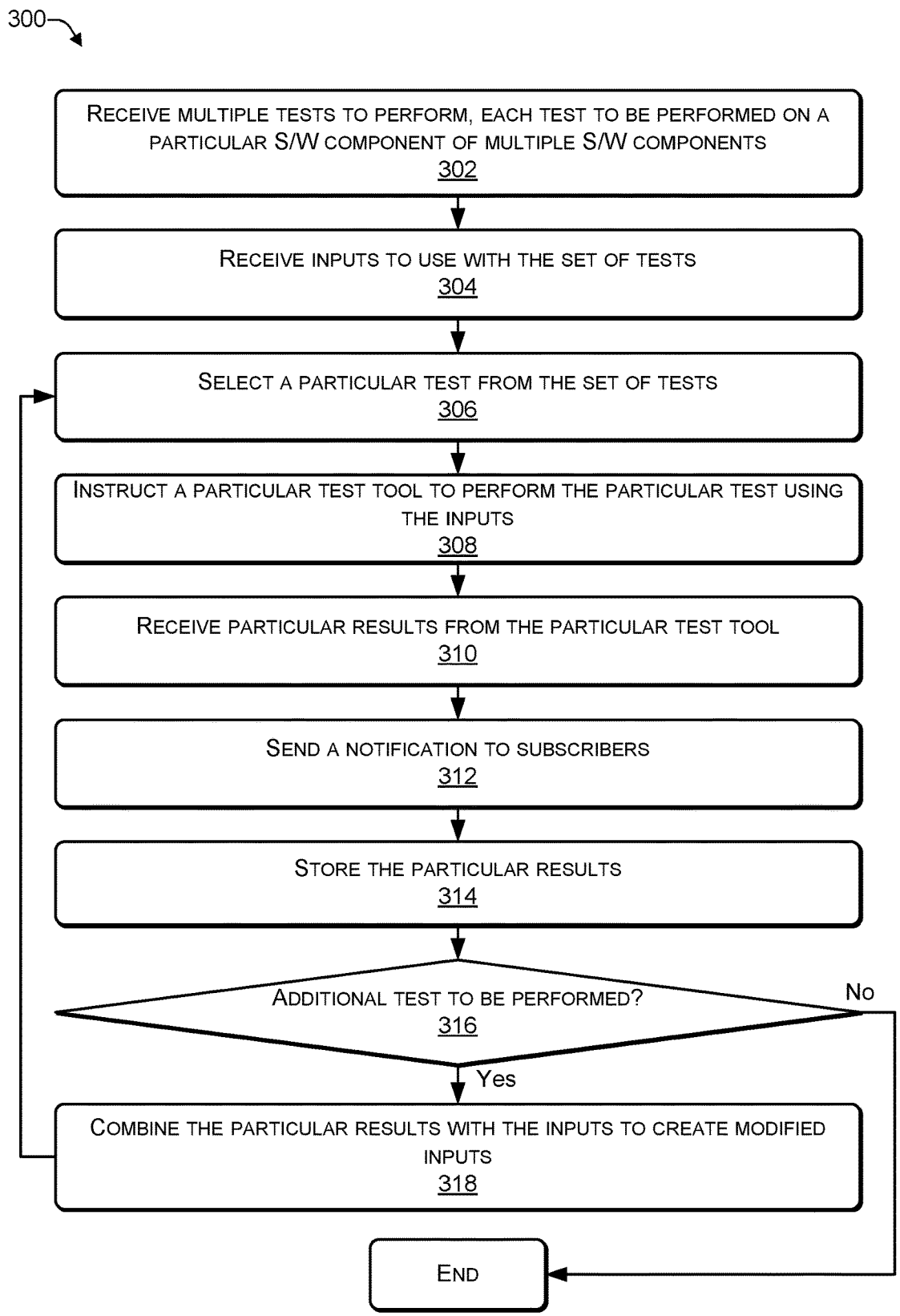
FIG. 3 is a flowchart of a process that includes receiving multiple tests to perform according to some embodiments.

The test case 202(4) may be expressed on a command line as follows:
cmd/c java -cp "C:\TestNG\lib\*;c: \launchPad\TestNGDropLocation\TestNG TestProject\TestNGTestProjectjar;"- Dbrowser=IE -DlaunchPadArgs=ReportLocation#c: \launchPad\TestNGDropLocation\118271\ TestNGTestProject\test -output org.testng.TestNG -testclass com.dell.testngtestproject.testcases.shipping In the flow diagram of FIG. 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 300 is described with reference to FIGS. 1 and 2 as described above, although other models, frameworks, systems and environments may be used to implement these processes FIG. 3 is a flowchart of a process 300 that includes receiving multiple tests to perform on multiple software (S/W) components according to some embodiments.

At 302, multiple tests to be performed may be received wherein each test may be performed on a particular software component of multiple software components. For example, in FIG. 1, the launch pad 102 may receive or be used to create multiple tests to be performed on the software components 108.

At 304, inputs to use with the set of tests may be received. At 306, a particular test may be selected from the set of tests. At 308, a particular test tool may be instructed to perform the particular tests using the inputs. At 310, particular results may be received from the particular test tool. For example, in FIG. 1, the launch pad 102 may select one of the tests 132 from the end to end tests 130 and send the instructions 126 to the appropriate one of the test tools 104 to test the software component 108. In response to performing the test of the software component 108, the test tool 104 may send results 128 to the launch pad 102.

In some cases, at 312, a notification may be sent to subscribers. For example, in FIG. 1, if one of the results 128 indicates a particular result that has been subscribed to then one or more of the subscribers 132 may receive the notification 130. For example, the subscribers 132 may subscribe to results 128 indicating that a particular test case 110 has failed, in which case the subscribers will receive a notification 130 indicating that the particular test case 110 failed. At 314, the particular results may be stored. At 316, a determination may be made whether additional tests are to be performed. If a determination is made at 316 that there are no additional tests to be performed, then the process may end. If a determination is made that an additional test is to be performed at 316, then the process may proceed to 318 where the particular results from the last test may be combined with the inputs to create modified inputs and the process may proceed to 306 where a next particular test may be selected from the set of tests and instructions may be sent to the particular test tool to perform particular tests using the inputs. For example, in FIG. 1, after the launch pad 102 instructs the test tool 104(1) to perform a test of the software component 108(1), the test tool 104(1) may send back the result 128(1) to the launch pad 102. The launch pad 102 may receive the results 128(1) and combine the results 128(1) with the corresponding test input 124(1) and then send the combined results as input to the next test tool to test next software component.

Thus, a launch pad may be used to initiate tests of multiple software components that are implemented using different software languages and that are tested using test cases developed using different testing tools. In this way, for example, a large corporation with multiple departments maintaining multiple software components and testing the software components using multiple test tools (e.g., test environments) using test cases developed for each test tool may maintain and test their software components without having to migrate each of the software components to a common software language and without having to migrate the test cases to a common test tool (e.g., testing environment). The launch pad may enable end-to end testing, e.g., from order creation to order fulfilment on an e-commerce website. For example, a first test tool may execute a first test case using a first set of inputs to create an order (e.g., including a purchase of a desktop computer, a display device, a keyboard, and a mouse). The results of the first test case, e.g., an order, may be used to instruct a second test tool to perform a second test case using a second set of inputs (e.g., a combination of the first set of inputs and the results of the first test case) to process the order (e.g., determine if the items are in stock for delivery within a predetermined time frame). The results of the second test case, e.g., the processed order, may be used to instruct a third test tool to perform a third test case using a third set of inputs (e.g., a combination of the first set of inputs and the results of the second test case) to process payment for the order (e.g., receive credit card information, process coupon(s), process reward points, and the like). The results of the third test case, e.g., processing payment for the order, may be used to instruct a fourth test tool to perform a fourth test case using a fourth set of inputs (e.g., a combination of the first set of inputs and the results of the third test case) to ship the order (e.g., send orders to the nearest delivery warehouses).

FIG. 4 illustrates an example configuration of a computing device 400 that can be used to implement the systems and techniques described herein, such as for example, hosting the launch pad 102, the test tools 104, or the like. The computing device 400 may include one or more processors 402 (e.g., CPU, GPU, or the like), a memory 404, communication interfaces 406, a display device 408, other input/output (I/O) devices 410 (e.g., keyboard, trackball, and the like), the sensors 206, and one or more mass storage devices 412 (e.g., disk drive, solid state disk drive, or the like), configured to communicate with each other, such as via one or more system buses 414 or other suitable connections. While a single system bus 414 is illustrated for ease of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 402 are one or more hardware devices that may include a single processing unit or a number of processing units, all of which may include single or multiple computing units or multiple cores. The processors 402 may include a graphics processing unit (GPU) that is integrated into the CPU or the GPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 may be configured to fetch and execute computer-readable instructions stored in the memory 404, mass storage devices 412, or other computer-readable media.

Memory 404 and mass storage devices 412 are examples of computer storage media (e.g., memory storage devices) for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein and may be any type of non-transitory media capable of storing computer-readable, processor-executable program instructions as computer program code that can be executed by the processors 402 as a particular machine configured for carrying out the operations and functions described in the implementations herein.

The computing device 400 may include one or more communication interfaces 406 for exchanging data via the network 110. The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 406 can also provide communication with external storage, such as a storage array, network attached storage, storage area network, cloud storage, or the like.

The display device 408 may be used for displaying content (e.g., information and images) to users. Other I/O devices 410 may be devices that receive various inputs from a user and provide various outputs to the user, and may include a keyboard, a touchpad, a mouse, a printer, audio input/output devices, and so forth.

The computer storage media, such as memory 116 and mass storage devices 412, may be used to store software and data. For example, the computer storage media may be used to store the command line 116, the test names 118, the test types.

Thus, the launch pad 102 may be used to initiate tests of the multiple software components 108 that are implemented using different software languages and that are tested using the test cases 110 developed using different testing tools 104. In this way, for example, a large corporation with multiple departments maintaining the multiple software components 108 and testing the software components 108 using multiple test tools 104 (e.g., test environments) using the test cases 110 developed for each individual test tool 104 may maintain and test the software components 108 without having to migrate each of the software components 108 to a common software language and without having to migrate the test cases 110 to a common test tool 104 (e.g., testing environment). The launch pad 102 may enable end-to end testing, e.g., from order creation to order fulfilment on an e-commerce website. For example, a first test tool 104(1) may execute a first test case 110(1) using a first set of inputs 112(1) to create an order (e.g., including a purchase of a desktop computer, a display device, a keyboard, and a mouse). The results 128(1) of the first test case 110(1), e.g., an order, may be used to instruct a second test tool 104(2) to perform a second test case 110(2) using a second set of inputs 112(2) (e.g., a combination of the first set of inputs 112(1) and the results 128(1)) to process the order (e.g., determine if the items are in stock for delivery within a predetermined time frame). The results 128(2) of the second test case, e.g., the processed order, may be used to instruct a third test tool 104(3) to perform a third test case 110(3) using a third set of inputs 112(3) (e.g., a combination of the first set of inputs 112(1) and the results 128(2) of the second test case) to process payment for the order (e.g., receive credit card information, process coupon(s), process reward points, and the like). The results 128(3) of the third test case, e.g., processing payment for the order, may be used to instruct a fourth test tool 104(4) to perform a fourth test case 110(4) using a fourth set of inputs (e.g., a combination of the first set of inputs 112(1) and the results 128(3) of the third test case) to ship the order (e.g., send orders to the nearest delivery warehouses).

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
selecting at least a first software test tool and a second software test tool configured to be performed on multiple software components, the multiple software components comprising at least:
a first software component written in a first computer language, the first software component configured to be tested using the first software test tool; and
a second software component written in a second computer language, the second software component configured to be tested using the second software test tool;
receiving, by the one or more processors, one or more inputs;
selecting, by the one or more processors, a first test of a set of software tests;
instructing, by the one or more processors, the first software test tool to perform the first test on the first software component using the one or more inputs;
receiving, by the one or more processors, first results from the first test tool performing the first test to the first software component using the one or more inputs;
selecting a second test of the set of software tests;
instructing the second test tool to perform the second test to the second software component using a combination of:
the one or more inputs; and
the first results from the first test tool performing the first software test to the first software component using the one or more inputs; and
receiving second results from the second test tool performing the second test to the second software component.

2. The method of claim 1, further comprising:
combining the one or more inputs and the first results to create second inputs; and
instructing the second test tool to perform the second test to the second software component using the second inputs; and
receiving second results from the second test tool performing the second test to the second software component using the second inputs.

3. The method of claim 1, further comprising:
determining, based on the first results, that the first test failed; and
sending a notification indicating that the first test failed to one or more subscribers associated with the first software component.

4. The method of claim 1, further comprising:
creating a command executable by a command line instructing the first test tool to perform the first test on the first software component using the one or more inputs; and
executing the command using the command line.

5. The method of claim 4, wherein:
the command includes a test name, a test type, and a test storage.

6. The method of claim 1, further comprising instructing, by the one or more processors, to perform the set of software tests in a particular order.

7. The method of claim 1, further comprising instructing, by the one or more processors, to test four to eight software components that are written in four to eight different computer languages using four to eight software test tools.

8. A server comprising:
one or more processors; and
one or more non-transitory computer readable media storing instructions executable by the one or more processors to perform operations comprising:
selecting at least a first software test tool and a second software test tool configured to perform on multiple software components, the multiple software components comprising at least:
a first software component written in a first computer language, the first software component configured to be tested using the first software test tool; and
a second software component written in a second computer language, the second software component configured to be tested using the second software test tool;
receiving one or more inputs;
selecting a first test of a set of software tests;
instructing the first software test tool to perform the first test on the first software component using the one or more inputs;
receiving first results from the first test tool performing the first test to the first software component using the one or more inputs;
selecting a second test of the set of software tests;
instructing the second test tool to perform the second test to the second software component using a combination of:
the one or more inputs; and
the first results from the first test tool performing the first software test to the first software component using the one or more inputs; and receiving second results from the second test tool performing the second test to the second software component.

9. The server of claim 8, the operations further comprising:
combining the one or more inputs and the first results to create second inputs;
instructing the second test tool to perform the second test to the second software component using the second inputs; and
receiving second results from the second test tool performing the second test to the second software component using the second inputs.

10. The server of claim 9, the operations further comprising:
determining, based on the first results, that the first test failed; and
sending a notification indicating that the first test failed to one or more subscribers associated with the first software component.

11. The server of claim 9, wherein:
creating a command executable by a command line instructing the first test tool to perform the first test on the first software component using the one or more inputs; and
executing the command using the command line, the command including a test name, a test type, and a test storage.

12. One or more non-transitory computer readable media storing instructions executable by one or more processors to perform operations comprising:
selecting at least a first software test tool and a second software test tool configured to be performed on multiple software components, the multiple software components comprising at least:
a first software component written in a first computer language, the first software component configured to be tested using the first software test tool; and
a second software component written in a second computer language, the second software component configured to be tested using the second software test tool;
receiving one or more inputs;
selecting a first test of a set of software tests;
instructing the first software test tool to perform the first test on the first software component using the one or more inputs;
receiving first results from the first test tool performing the first test to the first software component using the one or more inputs;
selecting a second test of the set of software tests;
instructing the second test tool to perform the second test to the second software component using a combination of:
the one or more inputs; and
the first results from the first test tool performing the first software test to the first software component using the one or more inputs; and
receiving second results from the second test tool performing the second test to the second software component.

13. The one or more non-transitory computer readable media of claim 12, further comprising:
combining the one or more inputs and the first results to create second inputs;
instructing the second test tool to perform the second test to the second software component using the second inputs; and
receiving second results from the second test tool performing the second test to the second software component using the second inputs.

14. The one or more non-transitory computer readable media of claim 13, the operations further comprising:
determining, based on the first results, that the first test failed; and
sending a notification indicating that the first test failed to one or more subscribers associated with the first software component.

15. The one or more non-transitory computer readable media of claim 13, the operations further comprising:
selecting a third test of the set of tests;
instructing a third test tool to perform the third test to a third software component using the one or more inputs and the second results; and
receiving third results from the third test tool performing the third test to the third software component using the one or more inputs and the second results.

16. The one or more non-transitory computer readable media of claim 12, the operations further comprising:
creating a command executable by a command line instructing the first test tool to perform the first test on the first software component using the one or more inputs; and
executing the command using the command line, the command including a test name, a test type, and a test storage.

* * * * *